US010458255B2

United States Patent
Roberge et al.

(10) Patent No.: US 10,458,255 B2
(45) Date of Patent: Oct. 29, 2019

(54) REMOVABLE FILM FOR AIRFOIL SURFACES

(71) Applicant: United Technologies Corporation, Hartford, CT (US)

(72) Inventors: Gary D. Roberge, Tolland, CT (US); George J. Kramer, Tolland, CT (US)

(73) Assignee: United Technologies Corporation, Farmington, CT (US)

( * ) Notice: Subject to any disclaimer, the term of this patent is extended or adjusted under 35 U.S.C. 154(b) by 299 days.

(21) Appl. No.: 14/761,029

(22) PCT Filed: Feb. 4, 2014

(86) PCT No.: PCT/US2014/014556
§ 371 (c)(1),
(2) Date: Jul. 15, 2015

(87) PCT Pub. No.: WO2014/123841
PCT Pub. Date: Aug. 14, 2014

(65) Prior Publication Data
US 2015/0377040 A1    Dec. 31, 2015

Related U.S. Application Data

(60) Provisional application No. 61/762,908, filed on Feb. 10, 2013.

(51) Int. Cl.
*F01D 5/28* (2006.01)
*B64D 15/00* (2006.01)
(Continued)

(52) U.S. Cl.
CPC ............ *F01D 5/288* (2013.01); *B64D 15/00* (2013.01); *F01D 5/02* (2013.01); *F01D 17/14* (2013.01);
(Continued)

(58) Field of Classification Search
CPC . F01D 5/02; F01D 5/288; F01D 9/041; F01D 17/14; F01D 25/005; F01D 25/02;
(Continued)

(56) References Cited

U.S. PATENT DOCUMENTS 5,182,906 A    2/1993 Gilchrist et al.
5,427,332 A    6/1995 Rauckhorst, III et al.
(Continued)

FOREIGN PATENT DOCUMENTS

EP    2216509 A1 *    8/2010    ............ B23P 15/04

OTHER PUBLICATIONS

English machine translation of EP2216509 by Espacenet Jun 21, 2017.*
Supplementary European Search Report for European Application No. 14749072.6 dated May 9, 2016.
International Preliminary Report on Patentability for International Application No. PCT/US2014/014556 dated Aug. 20, 2015.
(Continued)

*Primary Examiner* — Deming Wan
(74) *Attorney, Agent, or Firm* — Carlson, Gaskey & Olds, P.C.

(57) ABSTRACT

A fan section to be incorporated into a gas turbine engine has a rotor and a plurality of fan blades. The fan blades deliver air into a bypass duct defined inwardly of the nacelle and into a core engine. There are static vanes inward of the nacelle. A surface of the fan section is provided with a removable film material. A gas turbine engine and a method of refurbishing a surface are also disclosed.

17 Claims, 4 Drawing Sheets

(51) Int. Cl.
  *F01D 25/00* (2006.01)
  *F01D 25/02* (2006.01)
  *F02C 3/04* (2006.01)
  *F01D 5/02* (2006.01)
  *F01D 17/14* (2006.01)
  *B64D 45/00* (2006.01)
  *F01D 9/04* (2006.01)
  *F01D 25/24* (2006.01)

(52) U.S. Cl.
  CPC ........... *F01D 25/005* (2013.01); *F01D 25/02* (2013.01); *F02C 3/04* (2013.01); *B64D 2045/009* (2013.01); *F01D 9/041* (2013.01); *F01D 25/24* (2013.01); *F05D 2220/32* (2013.01); *F05D 2220/36* (2013.01); *F05D 2230/70* (2013.01); *F05D 2230/80* (2013.01); *F05D 2230/90* (2013.01); *F05D 2300/512* (2013.01); *Y02T 50/673* (2013.01)

(58) Field of Classification Search
  CPC ........ F01D 25/24; F02C 3/04; F05D 2220/32; F05D 2220/36; F05D 2230/70; F05D 2230/80; F05D 2230/90; F05D 2300/12; B64D 15/00; B64D 2045/009; Y02T 50/673; F05B 2280/20; B22F 5/04
  USPC ........................................ 29/888.04; 415/177
  See application file for complete search history.

(56) References Cited

U.S. PATENT DOCUMENTS

| | | | |
|---|---|---|---|
| 2002/0062544 A1 | 5/2002 | Bunker | |
| 2005/0141996 A1 | 6/2005 | Bernard | |
| 2007/0298270 A1* | 12/2007 | Hazel | B05D 7/14 428/469 |
| 2008/0138558 A1* | 6/2008 | Hojabr | C09J 7/22 428/42.2 |
| 2009/0022591 A1* | 1/2009 | Mujezinovic | F01D 5/3007 416/219 R |
| 2010/0180597 A1 | 7/2010 | Kraemer et al. | |
| 2010/0218376 A1 | 9/2010 | Boissy | |
| 2011/0110771 A1* | 5/2011 | Morgan | F01D 5/147 415/177 |
| 2011/0147219 A1 | 6/2011 | Lambourne et al. | |
| 2011/0177250 A1 | 7/2011 | Jakimov et al. | |
| 2012/0099978 A1* | 4/2012 | Beyer | B23P 15/04 415/197 |
| 2012/0107110 A1* | 5/2012 | Arantes | C23C 4/02 415/200 |
| 2012/0159952 A1* | 6/2012 | Arikawa | C23C 28/04 60/722 |

OTHER PUBLICATIONS

The International Search Report and Written Opinion for PCT Application No. PCT/US2014/014556, dated May 26, 2014.

* cited by examiner

REMOVABLE FILM FOR AIRFOIL SURFACES

RELATED APPLICATION

This application claims priority to U.S. Provisional Application No. 61/762,908, filed Feb. 10, 2013.

BACKGROUND OF THE INVENTION

This application relates to a removable film for providing an aerodynamically clean surface on airfoils.

Gas turbine engines are known and, typically, include a fan delivering air into a compressor. In an aircraft application, the fan will deliver air into a bypass duct defined inwardly of a nacelle in addition to the air delivered into the compressor. Air from the compressor is delivered into a combustion section where it is mixed with fuel and ignited. Products of this combustion pass downstream over turbine rotors driving them to rotate.

Historically, a turbine rotor has driven a fan rotor at a same speed. More recently, it has been proposed to insert a gear reduction between the turbine rotor and the fan. With the movement to the gear reduction, the fan may now rotate at slower speeds to provide reduced levels of fan pressure ratio while increasing the outer diameter of the fan blades dramatically. With this increase, a bypass ratio or the ratio of air delivered into the bypass duct compared to the volume of air delivered into the compressor has increased.

With this enlarged fan, laminar or near laminar aerodynamic design and other approaches for reduced fan duct aerodynamic loss becomes more important. However, surfaces of the fan, associated vanes, the nacelle, and inlet into the nacelle, etc. can deteriorate due to dirt, impacted insects or other airborne debris.

It has been proposed to wash these surfaces, however, this has not always removed all of the accumulated material. In addition, the impact of debris can cause small areas of damage to surface finish or component profile which, alone, or in combination with accumulated debris, may lead to local disturbances in the aerodynamic properties and degradation away from a laminar flow.

It is known to have a removable layer of thin adhesive film that can be removed once the cumulated dirt has been built up on an outer layer of the film. This type film has been utilized on the windows of race cars as an example. Removable film has also been proposed for the windshields of aircraft.

Existing automotive applications also include the use of such film to prevent or minimize paint damage from impacting debris.

SUMMARY OF THE INVENTION

In a featured embodiment, a fan section to be incorporated into a gas turbine engine has a rotor and a plurality of fan blades. The fan blades deliver air into a bypass duct defined inwardly of a nacelle and deliver air into a core engine. There are guide vanes inward of the nacelle. A surface of at least one of the blades, the nacelle, or the guide vane is provided with a removable film material.

In another embodiment according to the previous embodiment, the removable film material includes a plurality of layers of removable material.

In another embodiment according to any of the previous embodiments, the surface is on the fan blade.

In another embodiment according to any of the previous embodiments, the surface is on the nacelle.

In another embodiment according to any of the previous embodiments, the surface is on the guide vane.

In another embodiment according to any of the previous embodiments, the surface is on a core engine cowl.

In another embodiment according to any of the previous embodiments, the surface is on an area variable nozzle.

In another embodiment according to any of the previous embodiments, the removable film material has at least one of hydrophobic or icephobic properties.

In another embodiment according to any of the previous embodiments, the removable film material has a relatively sticky underside and a relatively less sticky outer side.

In another featured embodiment, a gas turbine engine has a fan section that delivers air into a bypass duct with a nacelle and delivers air into a compressor. The fan section has a rotor and a plurality of fan blades. There are static vanes inward of the nacelle. A surface of at least one of the blades, the nacelle, or the guide vane is provided with a removable film material.

In another embodiment according to the previous embodiment, the removable film material includes a plurality of layers of removable material.

In another embodiment according to any of the previous embodiments, the surface is on the fan blade.

In another embodiment according to any of the previous embodiments, the surface is on said nacelle.

In another embodiment according to any of the previous embodiments, the surface is on the guide vane.

In another embodiment according to any of the previous embodiments, the surface is on a core engine cowl.

In another embodiment according to any of the previous embodiments, the surface is on an area variable nozzle.

In another embodiment according to any of the previous embodiments, the removable film material has at least one of hydrophobic or icephobic properties.

In another embodiment according to any of the previous embodiments, the removable film material has a relatively sticky underside and a relatively less sticky outer side.

In another featured embodiment, a method of refurbishing a surface in a fan section for a gas turbine engine includes the steps of removing an outer removable layer from a surface in the fan section and leaving an underlying removable layer, such that the outermost surface can be removed along with accumulated debris.

These and other features may be best understood from the following drawings and specification.

DETAILED DESCRIPTION

Figure 1:
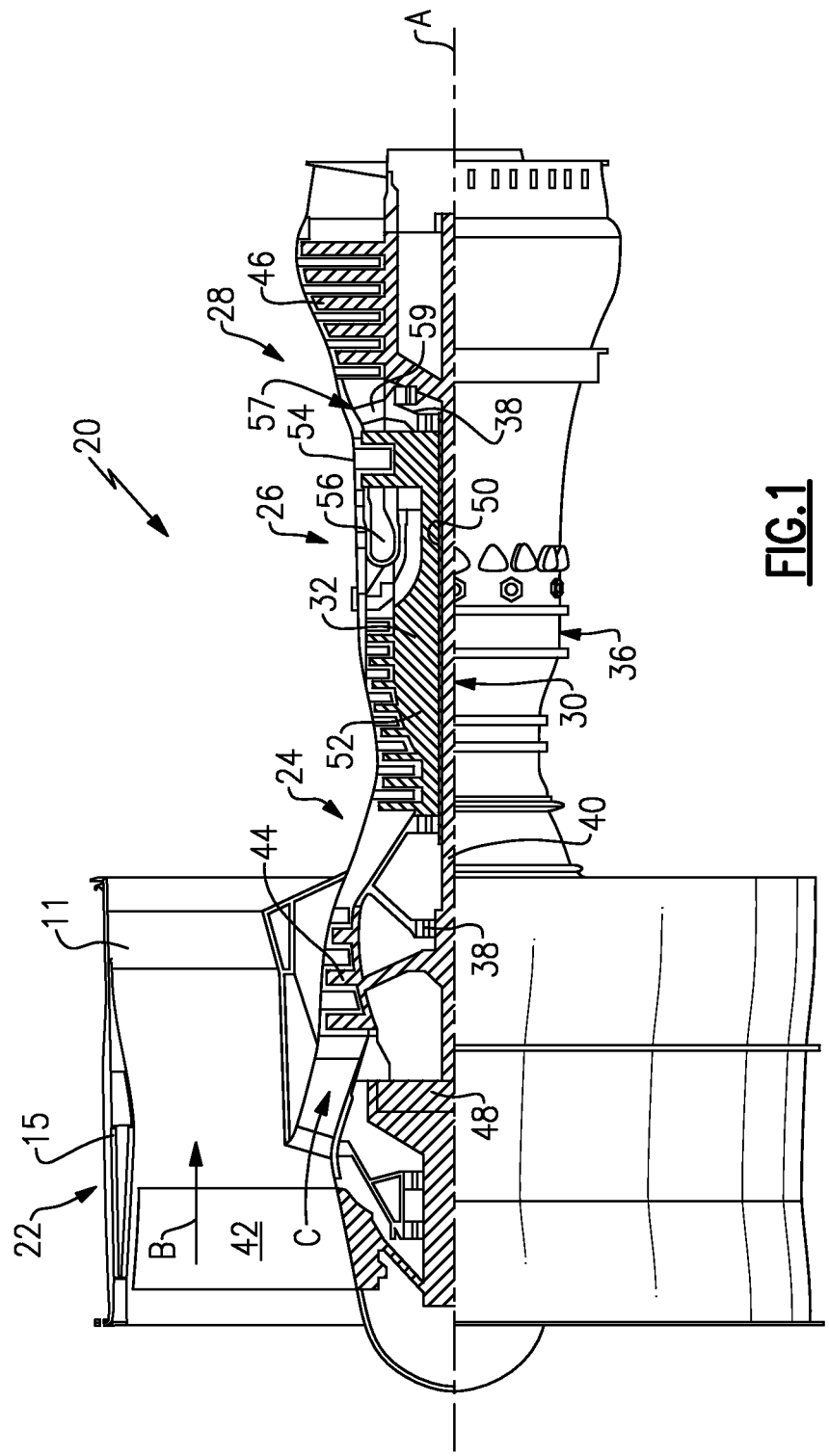
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines including three-spool architectures.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that interconnects a fan 42, a low pressure compressor 44 and a low pressure turbine 46. A fan exit guide vane 11 is shown downstream of the fan 42. The inner shaft 40 is connected to the fan 42 through a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path. The turbines 46, 54 rotationally drive the respective low speed spool 30 and high speed spool 32 in response to the expansion.

The engine 20 in one example is a high-bypass geared aircraft engine. In a further example, the engine 20 bypass ratio is greater than about six (6), with an example embodiment being greater than ten (10), the geared architecture 48 is an epicyclic gear train, such as a planetary gear system or other gear system, with a gear reduction ratio of greater than about 2.3 and the low pressure turbine 46 has a pressure ratio that is greater than about five (5). In one disclosed embodiment, the engine 20 bypass ratio is greater than about ten (10:1), the fan diameter is significantly larger than that of the low pressure compressor 44, and the low pressure turbine 46 has a pressure ratio that is greater than about five (5:1). Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of 1 bm of fuel being burned divided by 1 bf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second.

Figure 2A:
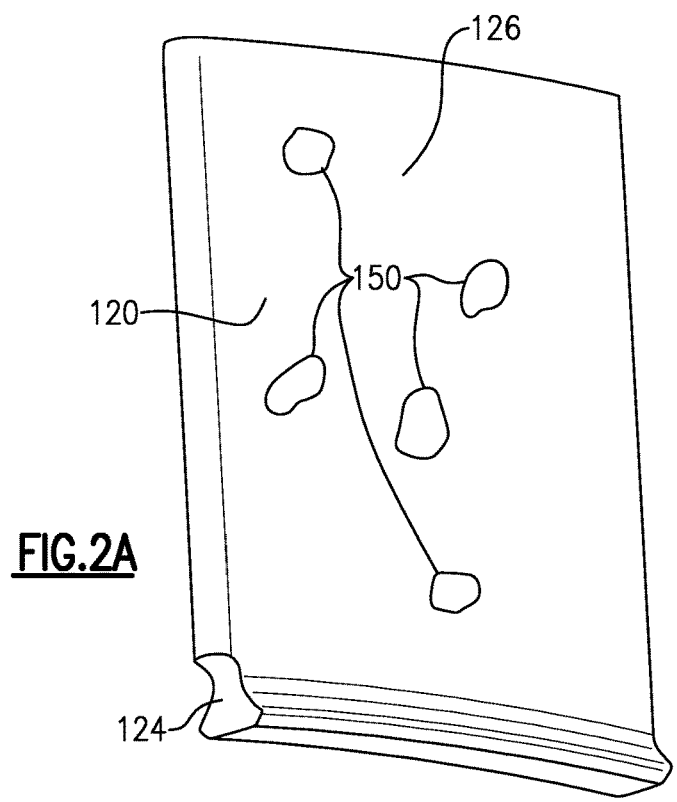
FIG. 2A shows a fan blade in a gas turbine engine.

FIG. 2A shows a fan blade 120 which may be incorporated into an engine such as shown in FIG. 1. A dovetail 124 is received within a rotor that rotates to drive a plurality of the blades 120. Airfoil 126 extends radially outwardly of the dovetail 124. Areas of accumulated debris 150 are shown schematically on the airfoil 126. It can be appreciated that the fan blade is in an area where it is subjected to a good deal of airborne debris and as this debris builds up, the aerodynamic qualities deteriorate. The same is true for the surfaces inwardly of the nacelle 15 as shown in FIG. 1, static vanes, or an inlet into the nacelle 15 as shown in FIG. 1.

Figure 2B:
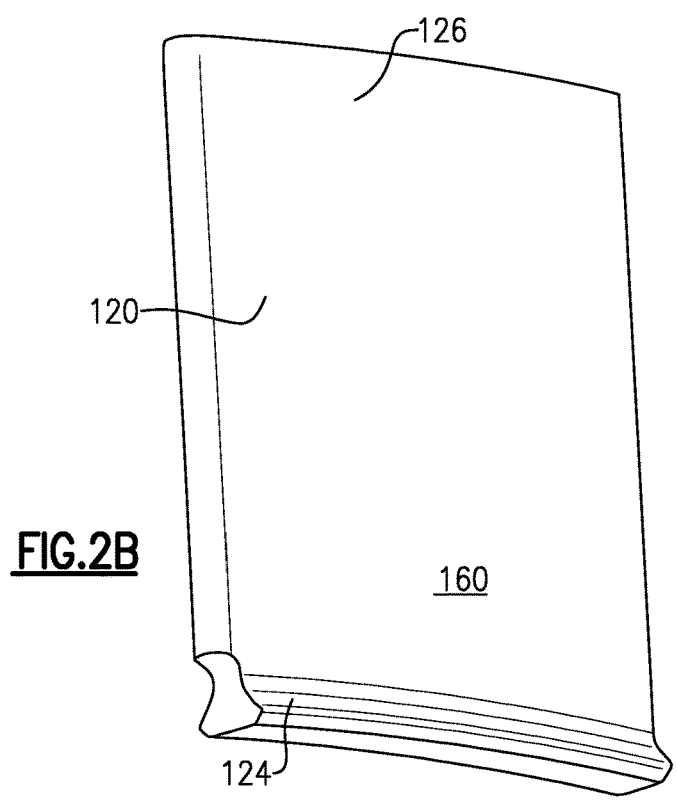
FIG. 2B shows a novel fan blade.

FIG. 2B shows an improved fan blade 120 wherein a surface 160 may be removed, as will be explained below, from at least the airfoil section 126.

Figure 2C:
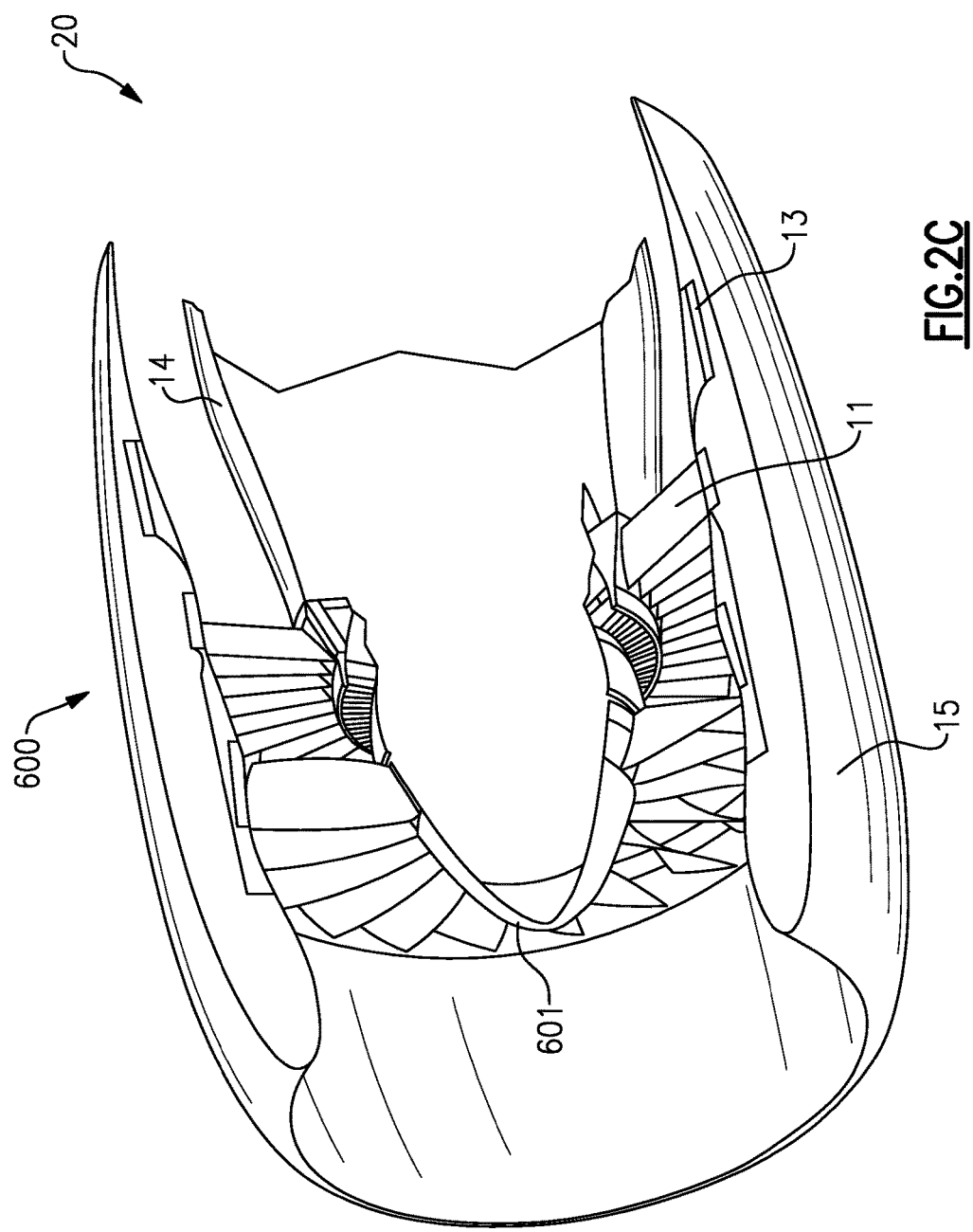
FIG. 2C shows details of a fan section.

FIG. 2C shows a number of details in the fan section 600. As shown, a rotor 601 rotates blades 120, and sits within a nacelle 15. The exit guide vanes 11 are downstream of the blades 120. A variable area nozzle 13 is positioned at a downstream end of the nacelle 15, and can move to change the area of the bypass duct, as known. Further, an engine core cowl 14 has an outer surface which also defines a portion of the bypass duct. Any one of the illustrated components in the fan section 600 may receive a similar removable surface. While the engine core cowl 14 and/or variable area nozzle 13 may not be considered part of a fan section in some definitions, for purposes of this application, they are included in the definition of "fan section."

Figure 3A:
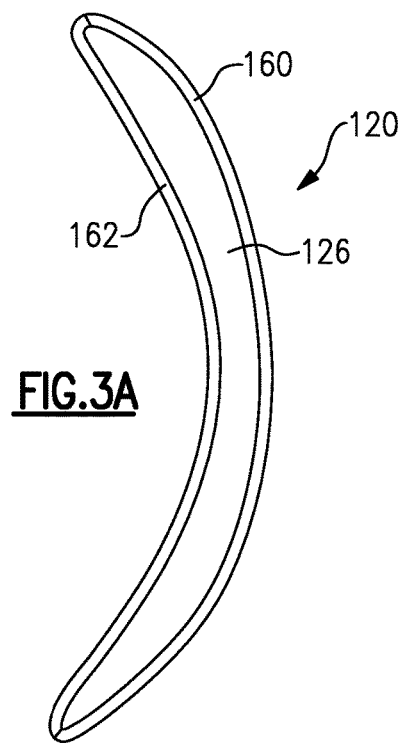
FIG. 3A is a cross-sectional view of the novel fan blade.

As shown in FIG. 3A, the surface 160 may be formed on one side of the airfoil 126, and another removable surface 162 may be formed on an opposed side.

Although the variable area nozzle 13 and exit guide vanes 11 may not typically be called part of the fan section, they are part of an airflow through the bypass duct, and will benefit from the removable surface. Thus, for purposes of this application, they are part of the fan section 600.

Figure 3B:
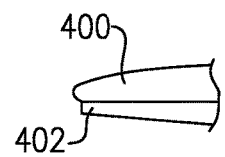
FIG. 3B shows another embodiment.
Figure 3C:
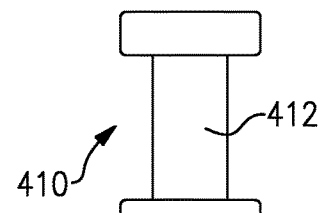
FIG. 3C shows yet another embodiment.

FIG. 3B shows a nacelle 400 having a removable material 402. FIG. 3C shows a static exit guide vane 410 having a removable material 412.

Figure 3D:
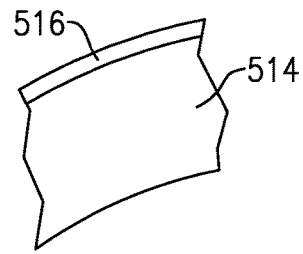
FIG. 3D shows another embodiment.
Figure 3E:
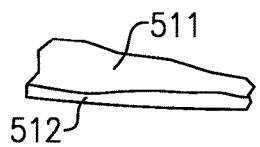
FIG. 3E shows yet another embodiment.

FIG. 3D shows an engine core cowl 514 having the removable material 516 on a radially outer surface. FIG. 3E shows a variable area nozzle 511 having the removable material 512 on a radially inner surface.

For purposes of this application, the fan blade 120, the nacelle 400, the static fan exit guide vane 410, the variable area nozzle 13, the engine core cowl 14 and any other related structure are collectively part of the fan section.

Figure 4:
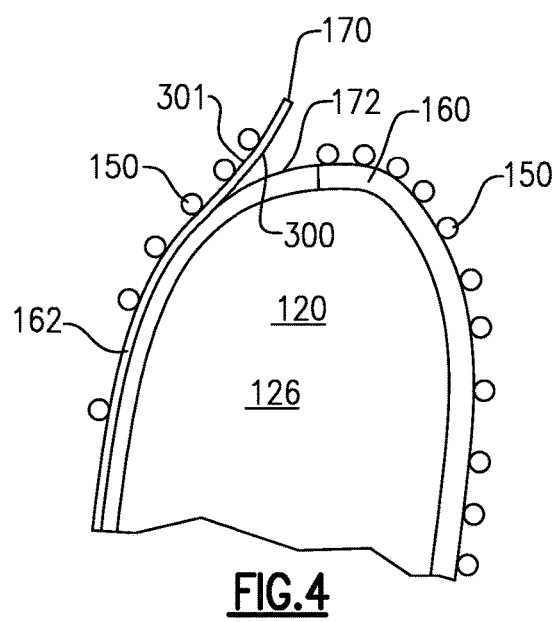
FIG. 4 shows a method step in refurbishing a surface of a fan blade.

FIG. 4 shows a method according to this application. As shown, debris 150 has built up on the outer surfaces 160 and 162 of the fan blade 120. As shown at 170, an outer layer is peeled away removing the debris 150 from the side 162. An underlying film layer 172 remains and is clean. A similar step would next occur on the side 160. Such film layers have a relatively sticky underside 300, and a relatively less sticky outer side 301.

Figure 5:
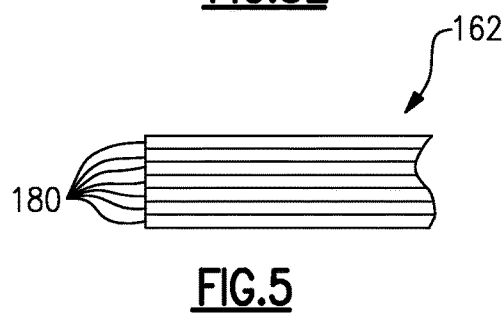
FIG. 5 is a simplified cross-sectional view of a multi-layer adhesive film.

As shown in FIG. 5, the surfaces/materials 160, 162, 402 and 412 may all be formed of a plurality of layers 180. Appropriate materials may be similar to those utilized on race car applications.

However, since the materials for this application need not be optically clear, more freedom in materials may be provided and materials that are more resistant to dirt accumulation or pitting may be utilized. Further, film materials that have hydrophobic or icephobic properties may also be utilized to repel water and/or limit ice accumulation.

Example materials may be publicly available from windshield tear-off materials. As an example, materials available under the trade names Pro-Shield or Racing Optics from Pro-Tint of Kannapolis, N.C.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A method of protecting and refurbishing a surface in a fan section for a gas turbine engine comprising steps of:
   peeling a protective outer removable layer from a surface in the fan section and leaving an underlying protective removable layer, such that said outermost surface can be removed along with accumulated debris; and
   further including a step of subsequently peeling away said underlying protective removable layer.

2. A fan section to be incorporated into a gas turbine engine comprising:
   a rotor and a plurality of fan blades, said fan blades for delivering air into a bypass duct defined inwardly of a nacelle and for delivering air into a core engine, and there being guide vanes inward of said nacelle;
   a surface of said fan section being provided with a removable film material;
   wherein said removable film material includes a plurality of layers of removable material, such that an outer layer may be peeled away from an underlying layer; and
   wherein said underlying layer may be peeled away from a subsequent layer underling said underlying layer.

3. The fan section as set forth in claim 1, wherein said surface of said fan section is on said fan blade.

4. The fan section as set forth in claim 1, wherein said surface of said fan section is on said nacelle.

5. The fan section as set forth in claim 1, wherein said surface of said fan section is on said guide vane.

6. The fan section as set forth in claim 1, wherein said surface of said fan section is on a core engine cowl.

7. The fan section as set forth in claim 1, wherein said surface of said fan section is on a variable area nozzle.

8. The fan section as set forth in claim 1, wherein said removable film material has at least one of hydrophobic or icephobic properties.

9. The fan section as set forth in claim 1, wherein said removable film material has a relatively sticky underside and a relatively less sticky outer side.

10. A gas turbine engine comprising:
    a fan section for delivering air into a bypass duct with a nacelle and for delivering air into a compressor;
    said fan section having a rotor and a plurality of fan blades, and there being static vanes inward of said nacelle;
    a surface of said fan section being provided with a removable film material;
    wherein said removable film material includes a plurality of layers of removable material, such that an outer layer may be peeled away from an underlying layer; and
    wherein said underlying layer may be peeled away from a subsequent layer underling said underlying layer.

11. The fan section as set forth in claim 10, wherein said surface of said fan section is on said fan blade.

12. The fan section as set forth in claim 10, wherein said surface of said fan section is on said nacelle.

13. The fan section as set forth in claim 10, wherein said surface of said fan section is on said guide vane.

14. The fan section as set forth in claim 10, wherein said surface of said fan section is on a core engine cowl.

15. The fan section as set forth in claim 10, wherein said surface of said fan section is on a variable area nozzle.

16. The gas turbine engine as set forth in claim 10, wherein said removable film material has at least one of hydrophobic or icephobic properties.

17. The gas turbine engine as set forth in claim 10, wherein said removable film material has a relatively sticky underside and a relatively less sticky outer side.

\* \* \* \* \*